Jan. 16, 1934.　　　　R. C. MERCER　　　　1,943,389
MEANS FOR TREATING MOTION PICTURE FILMS TO
PROVIDE FADE-IN AND FADE-OUT EFFECTS
Filed April 26, 1929　　　5 Sheets-Sheet 1

Fig.1

INVENTOR.
Raymond C. Mercer
BY Arthur Mack
ATTORNEYS.

Jan. 16, 1934.  R. C. MERCER  1,943,389
MEANS FOR TREATING MOTION PICTURE FILMS TO
PROVIDE FADE-IN AND FADE-OUT EFFECTS
Filed April 26, 1929     5 Sheets-Sheet 2

INVENTOR.
Raymond C. Mercer
BY
ATTORNEYS.

Jan. 16, 1934.  R. C. MERCER  1,943,389
MEANS FOR TREATING MOTION PICTURE FILMS TO
PROVIDE FADE-IN AND FADE-OUT EFFECTS
Filed April 26, 1929   5 Sheets-Sheet 5

INVENTOR.
Raymond C. Mercer
BY
ATTORNEYS.

Patented Jan. 16, 1934

1,943,389

UNITED STATES PATENT OFFICE 1,943,389

MEANS FOR TREATING MOTION PICTURE FILMS TO PROVIDE FADE-IN AND FADE-OUT EFFECTS

Raymond C. Mercer, Los Angeles, Calif.

Application April 26, 1929. Serial No. 358,296

6 Claims. (Cl. 95—89)

This invention relates in general to a means for treating motion picture films, and the principal object is to provide an improved means for treating motion picture film so as to gradually increase the density of the film thruout a section of the film embodying a substantial number of so-called "frames" whereby the image will be gradually eliminated in order to provide a fade-out effect.

The invention contemplates also the reversal of the operation so as to provide a gradual fade-in effect, or successive fade-out and fade-in effects.

In the latter event what is known as a "dissolve" is accomplished by gradually fading-out the picture in one section of film and fading-in the picture in a lapped section of the film.

In the consideration of this invention it will be understood that heretofore fade-ins, fade-outs, and dissolves have been necessarily accomplished by hand work on the film or by manipulation of the camera, whereas in my improvements I have provided automatic means of effecting the fading-in and fading-out operations in such a manner that a substantial number of films may be simultaneously treated at very low expense and in a substantially rapid operation.

In the practice of my invention, I may accomplish the objects hereinabove named in two or more ways. In one instance I may bleach a portion of the negative film and thereby remove the silver from the gelatin coating of the film which will correspondingly increase the density of the positive film produced from the negative. Thus, the change produced from the positive on the screen will be gradually faded out from clear sharp lines to a complete absence of lines.

In another case I may dye the positive film with a suitable opaque dye which will render the film gradually incapable of the transmission of light therethrough.

In another instance, for producing a "dissolve" from one scene to another I may by bleaching two negatives or two positives of different scenes, gradually eliminate the images from the films, and thereafter, by overlapping the two bleached films in reverse positions, i. e. the most dense portion of the one scene overlapping the least dense portion of the other scene, produce a "dissolve" from one scene to another.

The bleaching of the films is accomplished by gradually submerging a film in or moving a film through a volume of bleaching compound. I have found in my experiments that a suitable bleaching composition is produced by a mixture of:

| | |
|---|---|
| Ox gall | 1 lb. |
| Potassium ferricyanide | 4 lbs. |
| Common table salt | ½ lb. |
| Water | 30 gals. |

In a like manner the positive films are dyed by gradually moving a film through or submerging the same in a volume of dye. It is preferable to use an acid dye which is capable of being dissolved and washed out without affecting the gelatin or silver deposit on the film.

My invention, therefore, contemplates the provision of adequate and suitable means for supporting a film or films in such a position that they may be continuously or intermittently moved gradually through or submerged in a volume of dye or bleaching compound.

In order to best effect the desired result I have found it convenient and desirable to suspend the films from a vertically movable carrier which is capable of operation by gravity, hydraulic power, compressed air, or other means for gradually lowering a section of film into a substantially elongated vertical tank disposed below the carrier and adapted to contain the dye or bleaching compound. Such an apparatus will gradually subject successive portions of the films to attack by the dye or bleaching compound for gradually increasing periods of time. Thus, the density of the film treated by either the bleaching or dyeing process corresponds to the periods of time the successive portions of a film are submerged in the dye or bleaching liquids.

A further object of my invention is to provide suitable means for drying the film subsequent to a bleaching or dyeing operation, means for elevating and lowering the film carriers, and means for controlling the movement of the carriers corresponding to the requirements of a given film or films.

Other objects may appear as the description progresses.

In the accompanying drawings I have shown a preferred form of apparatus for the practice of my invention, subject, however, to modification within the scope of the appended claims without departing from the spirit of my invention. In said drawings.

Briefly described, the apparatus by means of which my method is carried out comprises a series of tanks with one or more film carriers movably mounted thereabove and adapted to support a plurality of motion picture films, together with mechanism by means of which the films may be gradually lowered into the liquids contained in the tanks.

The invention contemplates any suitable means for gradually submerging the film or films in the bleaching, dyeing, washing or hypo solution contained in the tank. Such a means may consist of a compressed air or hydraulic operated elevator or elevators for removably supporting the film, or intermittent ratchet or gear mechanism whereby the films will be lowered either continuously or intermittently into the tanks, but withal gradually so that successive portions of the film will be submerged in the liquids for gradually increasing or gradually decreasing periods of time.

In order to illustrate my invention, I have shown a compressed air mechanism for effecting and controlling the movement of the films into and from the liquids contained in the tanks, but it will be understood that other means may be substituted for the means shown with equally good effect and without departing from the spirit of my invention.

Figure 1:
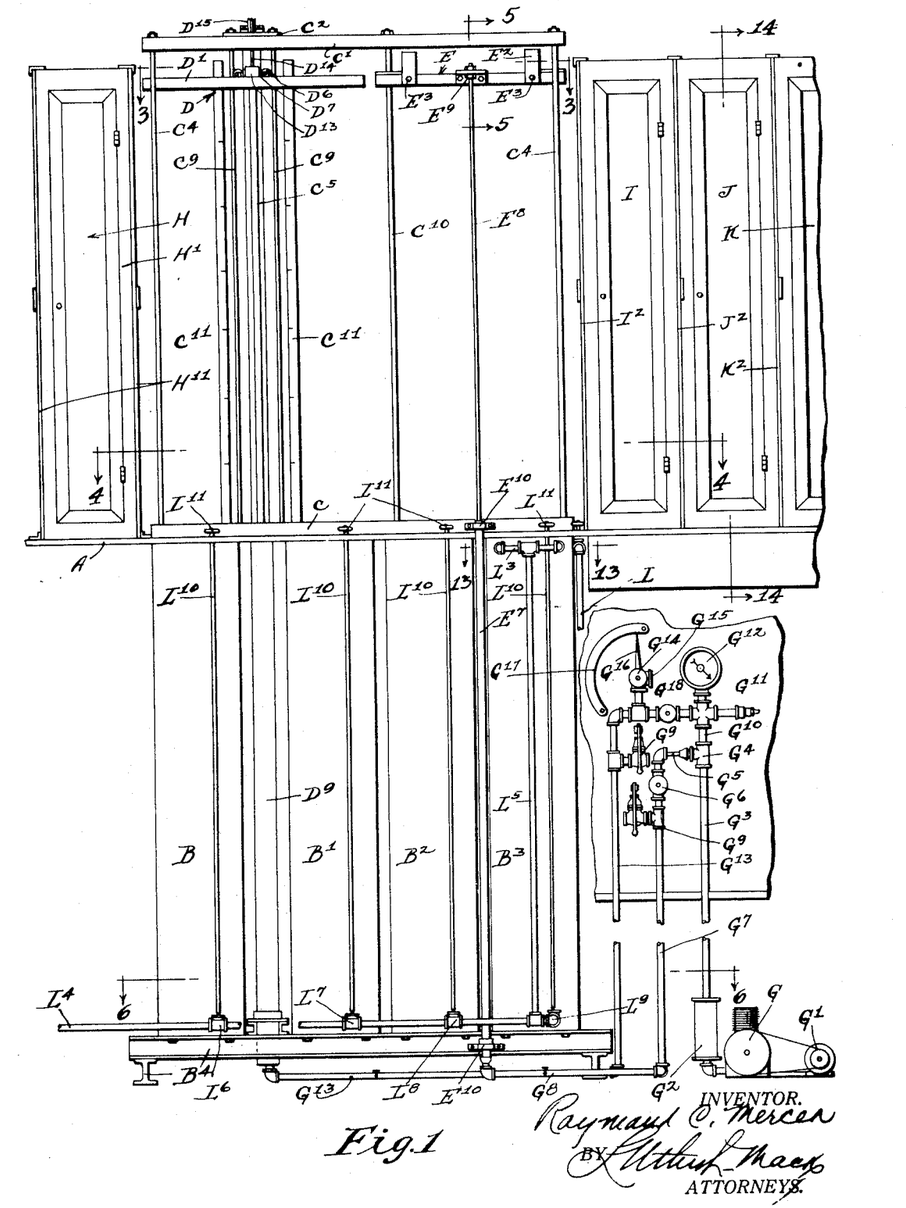
Fig. 1 is a front elevation of my improved apparatus.

Referring to Fig. 1, it will be observed that I arrange the film supporting and actuating mechanism above the level of the floor A of a room, while the tanks are arranged below the floor in a row. The tanks B, B1, B2, and B3 are substantially elongated and are formed of either metal or wood, and are adapted to contain, respectively, a liquid dye, a bleaching solution, a hypo solution, and water for finally washing the films at the completion of a bleaching or dyeing operation. The tanks are preferably of uniform size and are mounted on a foundation B4 composed of channels or I-beams to which the tanks are suitably connected. The tanks are open at their upper ends, but may be provided with suitable caps or closures when the tanks are not in use.

Figures 12, 13, 14, 15:
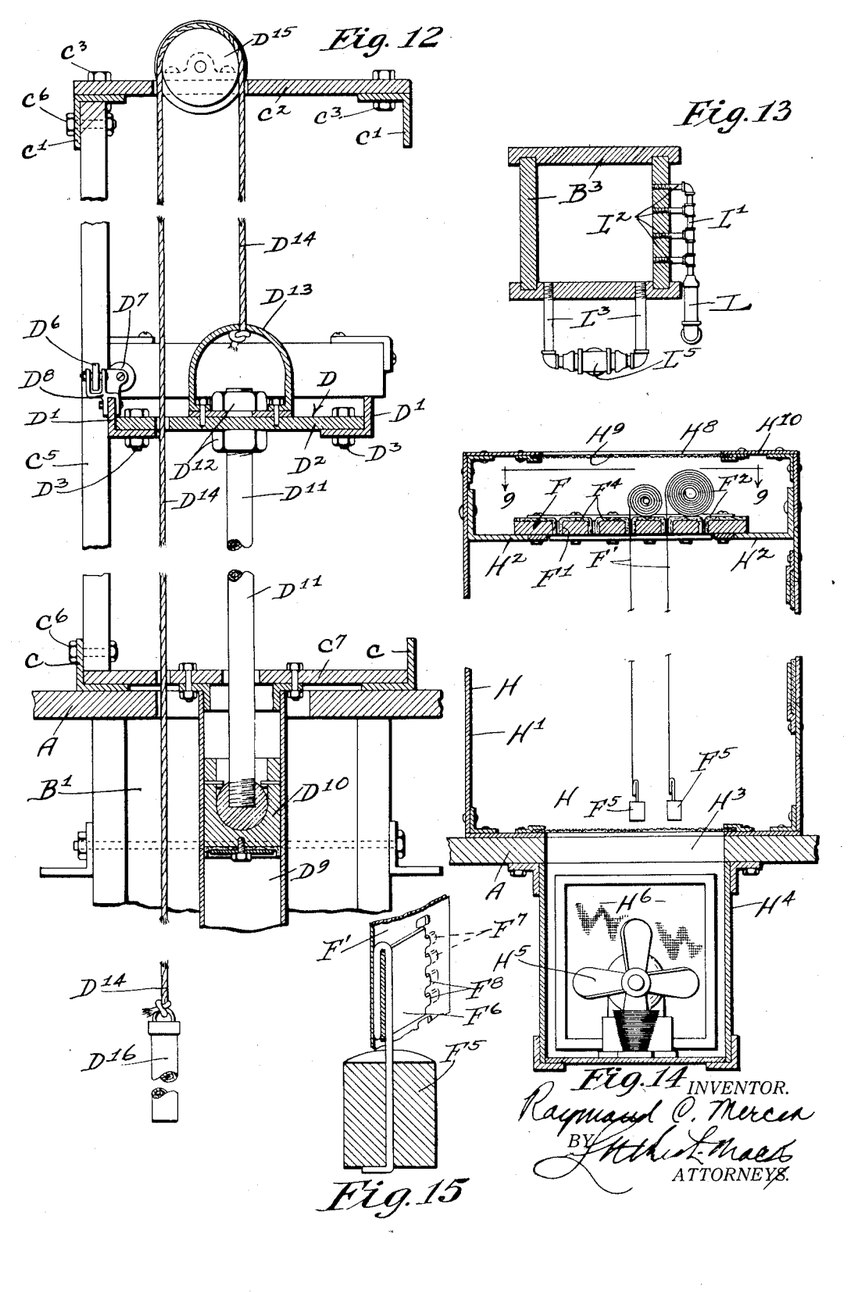
Fig. 12 is a transverse sectional elevation of the film carrier and associated parts on line 12—12 of Fig. 2.
Fig. 13 is a sectional plan of one of the tanks for the bleaching or dyeing compound on line 13—13 of Fig. 1.
Fig. 14 is a sectional elevation of one of the drier compartments as seen on line 14—14 of Fig. 1.
Fig. 15 is a sectional elevation showing a fragment of a film, a weight attached thereto, and a clip for supporting the weight on the lower end of a film to be treated.

Above the level of the floor A and supported over the tanks B, B1, B2 and B3, I provide a frame which may be formed of angle irons C, C supported on the floor, which are spaced apart and are disposed in parallel lengthwise of the row of tanks. A similar pair of angle irons C1, C1 are provided at the top of the frame substantially above the floor A which are cross connected by means of a plate C2 attached to the upper faces of the angle irons, said plate being attached to the angle iron by means of bolts C3, C3, etc. One or more of the plates C2 may be provided for connecting the angle irons C1, C1 together, and preferably the frame is mounted against a wall of a room with the left hand side thereof, as shown in Fig. 12, abutting and preferably attached to the wall.

The upper angle iron C1 and the lower angle iron C are connected by means of a plurality of rods or standards C4, C4 etc., one of which is arranged at or near each of the corners of the frame. As shown in Figs. 1 and 12, the rearmost angle irons C and C3 of the frame are vertically connected by means of a guide bar C5 which is attached to the angle irons C and C1 by means of bolts, as at C6. The bar C5 is intermittently positioned relative to the tanks B and B1.

Figure 2:
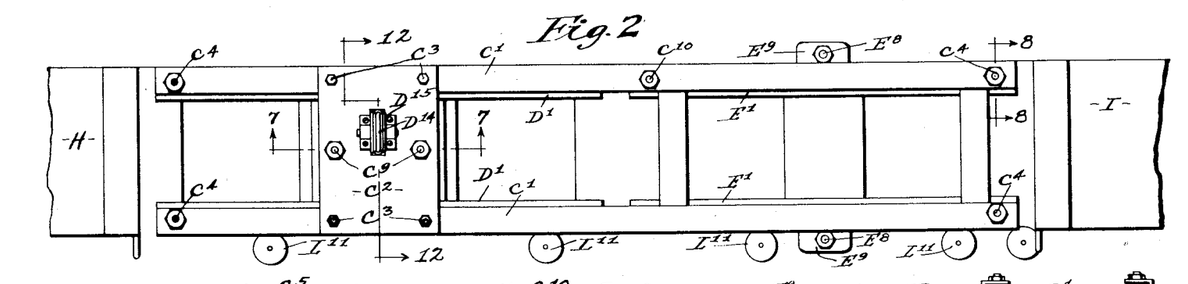
Fig. 2 is a top plan view of the same.
Figure 4:
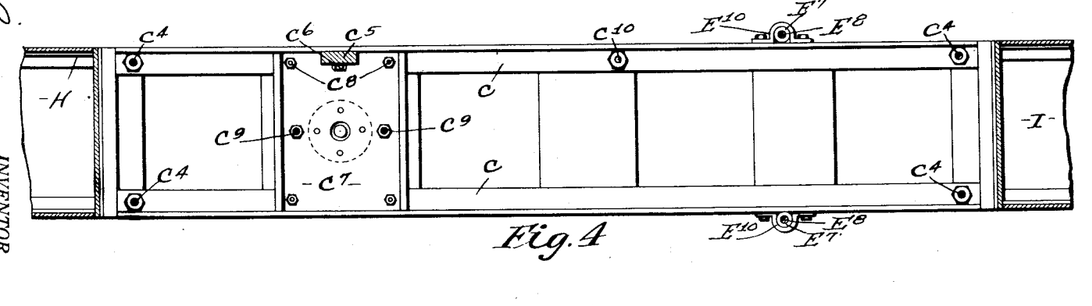
Fig. 4 is a sectional plan of the same on line 4—4 of Fig. 1.
Figure 5:
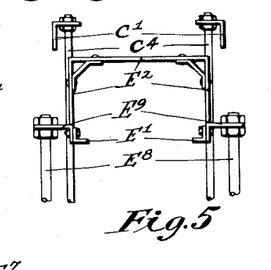
Fig. 5 is a transverse section on line 5—5 of Fig. 1.
Figure 6:
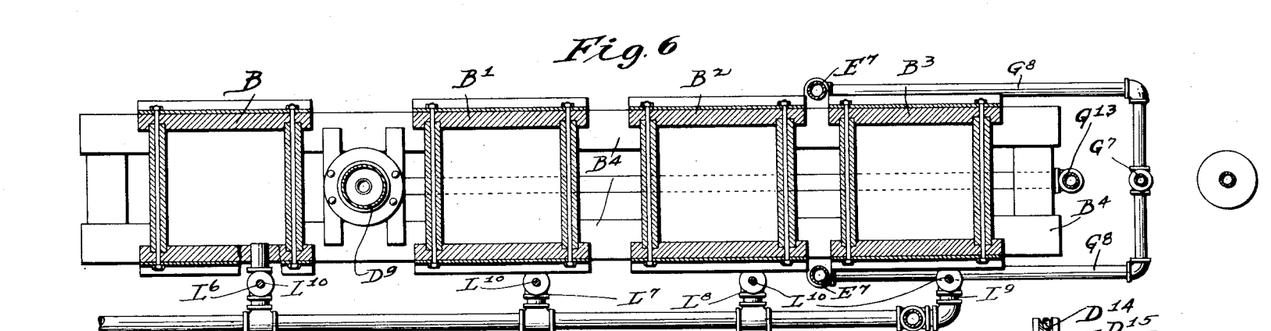
Fig. 6 is a sectional plan on line 6—6 of Fig. 1.

Angle irons C, C at the bottom of the frame are cross connected by means of a plate C7 in the plane of the plate C2, and said plate is attached to the angle irons C, C by means of bolts C8, C8, etc. The plates C2 and C7 are vertically connected by a pair of transversely spaced guide rods C9, C9 and said rods are positioned substantially in a central plane between the pairs of angle irons C, C and C1, C1, as shown in Figs. 2 and 4.

Figure 7:
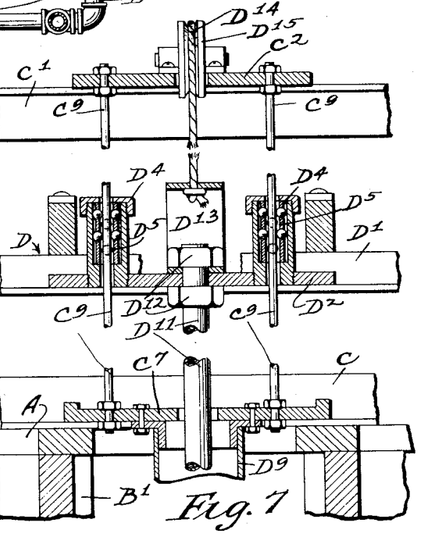
Fig. 7 is an enlarged sectional elevation partly broken away of one of the film carriers and associated parts on line 7—7 of Fig. 2.

A film carrier or elevator D is arranged for vertical movement above the tanks and between the pairs of angle irons C, C and C1, C1. Said elevator comprises a pair of spaced angle irons D1, D1 with the angles turned inwardly and a bed or plate D2 cross connecting said angle irons and attached thereto by means of bolts, as at D3, D3. The plate D2 carries a pair of anti-friction bearings D4, D4 composed of closed cylinders formed on or attached to the plate and provided with ball guides D5, D5 therewithin and adapted to engage the guide rods C9, C9 of the frame, as shown in Fig. 7.

Figure 3:
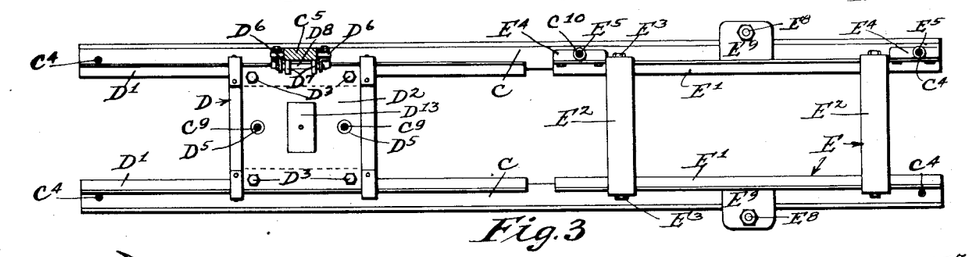
Fig. 3 is a sectional plan of the same on line 3—3 of Fig. 1.

The elevator D carries on its rear side a pair of rollers D6, D6 adapted to engage the opposite edges of the guide bar C5 and one or more rollers D7 adapted to engage the front face of said bar, as shown in Figs. 3 and 12. The rollers D6 and D7 are mounted on a suitable bracket D8 attached to the rearmost angle iron D1 of elevator D. In order to elevate and lower the film carrier D, I provide a hydraulic or compressed air cylinder D9 which is positioned centrally between the tanks B and B1 and is supported at its lower end on the foundation B4 for said tanks and at its upper end on the plate C7.

A piston D10 is arranged to slide in said cylinder and has a rod D11 extended upwardly therefrom which is attached to the plate D2 of the elevator D by means of nuts D12, D12 on opposite sides of the plate. The uppermost of the nuts D12 may be employed to attach a stirrup D13 to the plate D, and said stirrup is attached to one end of a cable D14, said cable extending upwardly over a pulley D15 which is mounted on the top of the plate C2 of the frame and extends downwardly through the plate C7 and floor A and carries a weight D16 on its lower end for partially counter-balancing the operation of the elevator D when and if desired.

Above the tanks B2 and B3 I provide a second elevator E which is slightly different in form and arrangement from the elevator D, but serves the same purpose. Both elevators, however, may be alike if found to be more convenient in operation. It is desirable to so arrange the second elevator E that the films may be moved onto and removed from the elevator at the right hand side of the apparatus, as seen in Fig. 1. This necessity requires a modified form of means for applying hydraulic or compressed air power to the elevator, whereby the same may be raised and lowered.

Elevator E comprises a pair of angle irons E1, E1 with their angles turned inwardly, and cross connected by means of a pair of U bars E2, E2 having their legs turned downwardly and attached to the outer faces of the angle irons by means of bolts, as at E3. Bars E2, E2 are substantially spaced apart lengthwise of the angle irons E1, E1.

Figures 8, 9, 10, 11:
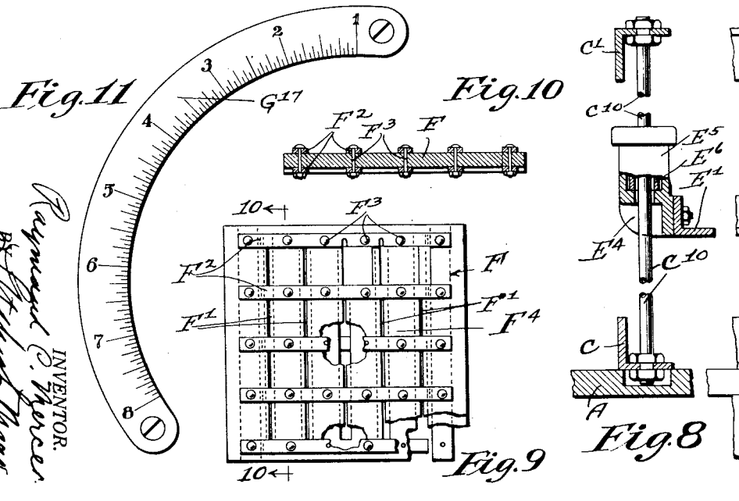
Fig. 8 is a fragmentary transverse section on line 8—8 of Fig. 2.
Fig. 9 is a plan view of one of the film carriers.
Fig. 10 is a transverse section of the same on line 10—10 of Fig. 9.
Fig. 11 is a face view of a graduated quadrant associated with the means for controlling the movement of the carrier.

The frame C is provided with a guide rod C10 at the rear of the frame, which is vertically disposed and is attached at its ends to the angle irons C and C1. The rod C10 in connection with one of the rods C4, as seen in Figs. 2 and 3, form guides for the elevator E, and the innermost angle iron E1 is provided with brackets E4, E4 on the rear side thereof, which carry cylinders E5, E5 having ball bearings E6, E6 therein for engagement with the guide rods C4 and C10, as shown in Fig. 8.

A pair of hydroulic or compressed air cylinders E7, E7 are mounted in an intermediate plane relative to the tanks B2 and B3 outwardly of the channels C, C, and C1, C1 of the frame. Said cylinders are provided with pistons of the character of the piston D10 in connection with cylinder D9 and piston rods E8, E8 which extend upwardly and are connected with the elevator E by means of brackets E9, E9 fixed to the outer sides of the channels E1, E1. The cylinders E7, E7 are attached to the channel irons C, C at their upper ends by means of fixtures E10, E10 and to the tank base B4 by means of similar fixtures. As shown in Figs. 9 and 10 the films are adapted to be carried on a holder F comprising a rectangular plate adapted to be removably supported on the elevators D and E. The plate may be made of wood, metal, or composite material, and is arranged to slide longitudinally on the angle members D1 and E1 of the elevators D and E.

The plate F is so arranged that a plurality of films F', F' as seen in Fig. 14, may be supported on the holder in a single operation, and to this end is provided with a plurality of parallel slits F1, F1, etc., and a plurality of transversely positioned parallel cleats F2, F2, which subdivide the holder into a substantial number of positions or seats for the films F', F'. The cleats F2 are attached to the plate F by means of bolts F3. In order to avoid damage to the film, I prefer to cover the top of the plate F with felt or fabric, as at F4, and to cut the cushion thus provided so that portions thereof may be bent downwardly into the slits F1 for engagement with opposite sides of the films F'. The fabric F4 may be glued or otherwise attached to the plate F.

By reference to Fig. 1 it wil be noted that the arrangement of the elevator E permits the movement of the holder F with a number of films thereon onto the angle irons D1, D1 of elevator E at the left side of the elevator, as seen in Fig. 1. The films and holder are moved onto the right side of the elevator D over the elevator E, or from the right side of the frame.

In Fig. 1 I have shown the compressed air apparatus for connection with the cylinders D9 and E7, E7 for raising and lowering the elevators D and E. This apparatus includess a compressor G operatively connected with a motor G1 and a storage tank G2. The tank is connected by means of a pipe G3, a T G4, a branch pipe G5, a valve G6, a pipe G7, and branches G8, G8 with the lower end of cylinders E7, E7 the valve G6 serving to regulate the application of pressure to said cylinders. A safety pop valve G9 is preferably inserted between valve G6 and cylinders E7, as shown in Fig. 1. Pipe G3 is connected through T G4, a nipple G10, and a fitting G11 with a gauge G12, and fitting G11 is connected with a shut-off valve G18 and a pipe G13 leading to the bottom of cylinder D9.

A safety pop valve G9 may be also connected with the pipe G13. The pressure in cylinder D9, and likewise in cylinders E7, E7, if necessary, may be controlled by means of a valve G14 which is connected with a pipe G13 between valve G18 and cylinder D9. Valve G14 has an outlet G15 to the atmosphere, and an indicator G16 is attached thereto which moves over a graduated quadrant G17 as shown in Figs. 1 and 11. The valves G6 and G18 control the application of air to the cylinder D9 and the pair of cylinders E7, E7 respectively, while the valve G14, in the arrangement shown, further controls the application of air to the cylinder D9; that is to say, that when valve G18 is open and valve G14 is closed, the full pressure in the tank G2 will be applied to the piston D10 in the cylinder D9 for raising the elevator D to the uppermost limit of its stroke preparatory to a dyeing, bleaching, fixing, or washing operation.

When, however, the valve G14 is open, the pressure applied to piston D10 is relieved through the outlet G15 to a desired extent so that the elevator D may gradually move downwardly at a selected speed for submerging the films carried thereby in the tanks. I have shown the control valve G14 and the indicator G16 associated only with the elevator D, but it will be quite obvious that I may also employ such a control in connection with the elevator E if desirable.

It will be noted, however, that it will require a longer period of time to dye and bleach a film in the tanks B and B1 than is necessary for fixing or washing the films in the tanks B2 and B3. Therefore, I have eliminated the control device for the elevator E.

At the left hand side of the apparatus as shown in Fig. 1, I provide a drying cabinet H, and at the right hand other drying cabinets I, J, and K, preferably one of such cabinets for each of the tanks B, B1, B2, and B3. In Fig. 14 I have shown a sectional elevation of one of the drying cabinets, which is typical of all of such devices, and includes a compartment H1 formed within a wood or metal cabinet, as at H, and provided with angle iron supporting members H2, H2 on opposite sides thereof with their flanges turned inwardly so as to removably support the film holders F in such a manner that the films F', F' may be suspended within the cabinet between the angle iron supporting members H2, H2. The bottom of each of the cabinets is provided with an opening, as at H3, which communicates with a housing H4 suspended below the floor A and adapted to support a fan H5.

One or more of the sides of the housing H4 may be provided with a screened opening H6, and a screen H7 may also be supported above the opening H3. The top H10 of the cabinet is provided with a vent opening H8, also covered by a screen H9. Thus a circulation of air is maintained thru the cabinets for drying the films F' subsequent to a drying, bleaching, fixing, or washing operation.

It will be noted that when the films F' are suspended from the elevators D and E, or within the drying cabinets H, I, J, and K, the upper portions of the films are rolled and fastened with clips, while the portions to be treated are suspended from the holders F and are held plumblike by means of weights F5 held on clips F6 which have teeth F7 adapted to be held in the perforations F8 of the films.

Water is supplied to the wash tank B3 from a service pipe L, which has a reduced portion L1 connected with a plurality of small inlets L2, L2, etc., for breaking up the stream of water into a number of jets so as to prevent undue agitation in a filling operation. As shown in Figs. 1 and 13, the water is supplied to the tank B3 at the top, and a pair of overflow outlets L3, L3 are commonly connected with a main drain pipe L4 by means of a vertical pipe L5. The drain pipe L4 is provided with a plurality of valves L6, L7, L8, and L9, which are connected respectively with the tanks B, B1, B2, and B3 for regulating the draining of the liquid contents from said tanks. Each of said valves is provided with an elongated rod L10 which extends upwardly above the level of the floor A and is provided with a valve operating member L11 which is accessible above the floor for regulating the draining of the liquids from the tanks.

Attached to the wall or frame rearwardly of either or both of the elevators D and E, I may provide one or a pair of height gauges C11, C11, graduated in feet and inches, as shown in Fig. 1, for measuring lengths of film to be treated and for setting the elevators D and E at proper elevations above the tanks.

Each of the cabinets H, I, J, and K is provided with laterally sliding partitions, as at H11, H11, I2, J2, and K2, etc. Said partitions are disposed at right angles to the supporting angles H2 within the cabinet, so that the carriers or holders F may be moved from the elevator D to the left into the cabinet H and onto the members H2 when the partition H1 is open. In like manner the film carriers may be moved to the right from elevator D over the members E1 of elevator E and thence into the cabinet I when the partition I2 is open. Similarly, film carriers may be moved from the elevator E through the cabinet I and into the cabinets J and K when the partitions J2 and K2 are open.

The elevators D and E, when normally positioned at the uppermost extreme of their movement, are in the same plane as the members H2 in each of the cabinets.

Referring to Fig. 1, it will be observed that the control panel for regulating the supply of compressed air to the cylinder D9 and E7, E7 is shown below the floor line because of the lack of room in the figure to place it thereabove. Such control panel is usually mounted above the floor A on the wall or a frame adjacent to the elevators D and E.

The graduations in the quadrant G17 correspond to different rates of speed of the elevator D so that the valve G14 may be set with the indicator G16 opposite one of the graduations to correspond to a pre-determined rate of speed that the film F' will move into submergence in the tank B or B1. The rate of speed at which the films are lowered into the tanks depends upon the density of film desired in a "dissolve" or fade-out, and the kind and quality of solutions employed for treating the film and the length of time necessary to properly dye or bleach the film.

In operation, the tanks B, B1, B2, and B3 are filled respectively with a dye, a bleaching solution, hypo, or other suitable fixing solution, and water for finally washing the films. As hereinbefore stated, to produce a fade-out of a motion picture, a positive film is gradually submerged in the dye tank B when the elevator D1 is operated by the compressed air apparatus shown or otherwise, and at a rate of speed corresponding to the setting of the control valve G14.

The result of such an operation will be that the lowermost end of the film F' which is submerged in the dye for the longest period, will be the most dense, and therefore the least impervious to light, while the upper end of the film will be the least dense and most impervious to light. The intermediate portions of the positive film so treated will be graduated between these extremes so that when a picture is projected through the treated portion of the film the subjective of the film will either gradually fade-out or fade-in, as the case may be.

Figure 18:
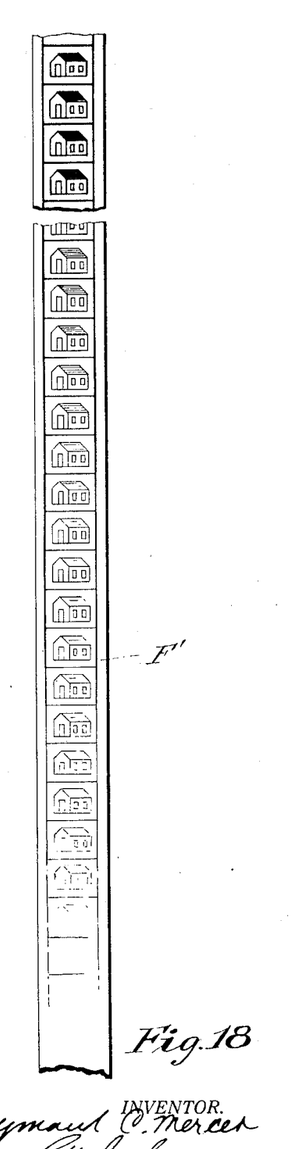
Fig. 18 is a view of a section of film showing a fade-in or fade-out of a given scene, and extending over a selected portion of the length of the film.

In a bleaching operation a negative or a positive film is lowered in a similar manner and at a desired rate of speed into the bleaching solution contained in tank B1, with the result indicated in Fig. 18. Thus the lowermost portion of the film F' which is submerged in the bleaching solution for a maximum period of time will completely remove the silver from the film and therefore picture or image, while the upper end of the film will present the normal image. The intermediate portions of the bleached film will be graduated in density to correspond to the varying periods of time the respective portions were submerged in the bleaching solution.

Following the dyeing operation, the elevator D is elevated by closing valve G14 and opening valve G18 into the positions shown in Fig. 1 so that the film or films supported on the holder F in the carrier may be moved to the left, as seen in Figure 1, into the drying cabinet H. In a like manner, films which are bleached in the tank B1 are removed from the right hand end of the elevator D and are positioned on the elevator E, after which the elevator E is operated for submerging the bleached film into the washing tank B3.

Preferably, while the films are submerged in the water of tank B3, the water supply valve is operated for effecting a circulation of water in said tank, water being drained from the bottom and top and admitted at the top of the tank so as to completely remove the silver from the film. Thereafter the elevator E is raised manually or by air pressure, and the washed film or films are moved thru the cabinets I and J into the drying cabinet K. Certain of the tanks may be employed for containing a developing solution and a fixing solution, as, for instance, the tanks B2 and B3, and certain films may be developed while others are fixed, in a single operation of the elevator E, after which the films may be moved into the cabinets I and J for a drying operation.

Figure 16:
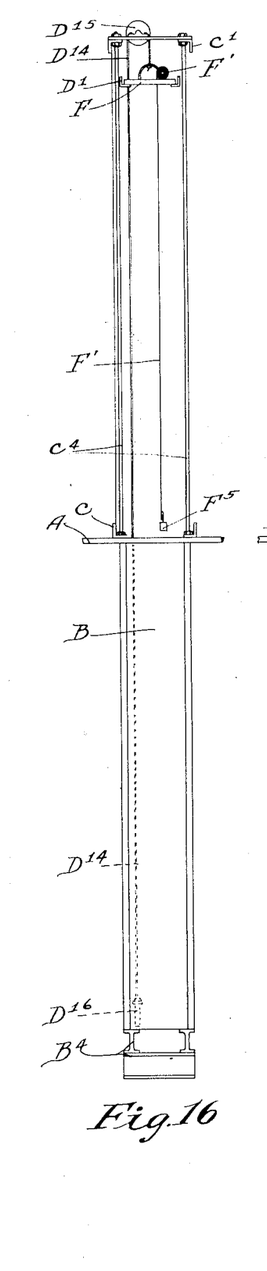
Figs. 16 and 17 are side elevations of the apparatus showing respectively a film about to be submerged and the same film completely submerged in one of the tanks for a bleaching or dyeing operation.
Figure 17:
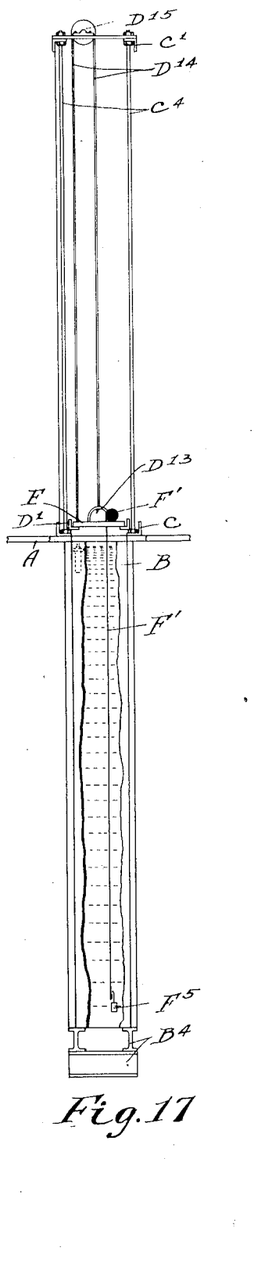

As shown in Figs. 16 and 17, the elevators D and E have a range of movement slightly greater than the length of the tanks B, B1, B2 and B3, so that, as seen in Fig. 16, when the elevators are held at their uppermost extreme of travel the films F' will be completely supported above the floor A and externally of the tanks. It will be understood that the holder F is so arranged that it will support a substantial number of films for simultaneous drying, bleaching, developing, fixing, or washing, but only a single film is shown supported thereon in Figs. 16 and 17.

The arrangement of my apparatus shown and described herein provides for a continuous movement of the films into the liquids of the tanks, the speed of which is regulated and controlled by compressed air or hydraulic pressure.

I may, however, substitute electric, mechanical, or electro-mechanical means for moving the films either continuously or intermittently, for the purpose of gradually submerging the films into the liquid so as to vary the density of the films and their permeability to light.

As hereinbefore stated, positive films are generally dyed, while negative films are generally bleached, for fading-out a picture, but, for the purpose of dissolving one scene into another in a gradual process, I am enabled, by means of my method, to produce satisfactory results by bleaching two positive films with different subjective matter thereon, and by reversing and overlapping the treated portions of the films so that the most dense portion will overlap the least dense portion of the other, and vice versa. Thus, when light is projected through the overlapped portions of the two films, one scene will predominate at the beginning of a projection operation, while the other scene will be extremely vague. The further projection of the composite picture will gradually dissolve the predominating scene into another scene. Thus, two fade-outs may be employed for producing a "dissolve."

Heretofore the bleaching and dyeing has been done by hand, requiring long periods of time in order to produce accurate fade-outs or fade-ins. It will be quite obvious that by the means of the apparatus I have shown and described I am enabled to produce better and more accurate results and to more definitely vary the density of the films by gradually submerging the films into the dyeing and bleaching solutions, than has otherwise been possible.

What I claim is:

1. An apparatus for varying the opacity of motion picture films comprising a vertically disposed elongated tank for containing a dye or bleaching solution, a frame superposed relative to said tank, a film carrier vertically movable on said frame relative to said tank, means removably held on said carrier for supporting a plurality of strips of film to be treated in suspended positions above said tank, means for lowering said carrier and said films at selected speeds, whereby successive portions of the films will be immersed in the dye or bleaching solution for gradually increasing periods of time corresponding to the relative positions of the said portions of films in the tank at the completion of the lowering operation, and connections between said carrier operating means and a fluid pressure system for imparting movement to the carrier.

2. An apparatus for varying the opacity of motion picture films comprising a vertically disposed elongated tank for containing a dye or bleaching solution, a frame superposed relative to said tank, a film carrier vertically movable on said frame relative to said tank, means removably held on said carrier for supporting a plurality of strips of film to be treated in suspended positions above said tank, and means for lowering said carrier and said films at selected speeds, whereby successive portions of the films will be immersed in the dye or bleaching solution for gradually increasing periods of time corresponding to the relative positions of the said portions of films in the tank at the completion of the lowering operation, and means for regulating the speed of submergence of the film in the tank to correspondingly vary the density of the film to a desired extent.

3. An apparatus for varying the opacity of motion picture films comprising a vertically disposed elongated tank for containing a dye or bleaching solution, a frame superposed relative to said tank, a film carrier vertically movable on said frame relative to said tank, means removably held on said carrier for supporting a plurality of strips of film to be treated in suspended positions above said tank, means for lowering said carrier and said films at selected speeds, whereby successive portions of the films will be immersed in the dye or bleaching solution for gradually increasing periods of time corresponding to the relative positions of the said portions of films in the tank at the completion of the lowering operation, and means for counterbalancing the carrier so as to permit the ready retraction of the carrier and film therein, subsequent to the treatment thereof, for removal of the film from the carrier.

4. An apparatus for varying the opacity of motion picture films comprising a vertically disposed elongated tank mounted below and open at the floor of a room, a frame superposed relative thereto, guides on said frame, a film carrier movable on said guides in the vertical plane of said tank and provided with means for removably supporting a film in position for submergence in said tank, power operated means connected with and for lowering said carrier and said film into positions, respectively, so that the carrier when at its lowest extreme of movement will be disposed above the tank and the film will be submerged in the tank, means for retracting said carrier and said film so that the lower ends of the film will be disposed above the tanks, to permit the removal of the film from the carrier, and means for regulating the lowering of the carrier and films, whereby the film will be submerged in the solution of the tank for variable periods of time.

5. An apparatus for varying the opacity of motion picture films comprising a vertically disposed elongated tank for containing a dye or bleaching solution, a frame superposed relative to said tank, a film carrier vertically movable on said frame relative to said tank, means removably held on said carrier for supporting a plurality of strips of film to be treated in suspended positions above said tank, means for lowering said carrier and said films at selected speeds, whereby successive portions of the films will be immersed in the dye or bleaching solution for gradually increasing periods of time corresponding to the relative positions of the said portions of films in the tank at the completion of the lowering operation, and connections between the carrier and a source of supply for imparting fluid pressure to and for operating the carrier and film.

6. An apparatus for varying the opacity of motion picture films comprising a vertically disposed elongated tank for containing a dye or bleaching solution, a frame superposed relative to said tank, a film carrier vertically movable on said frame relative to said tank, means removably held on said carrier for supporting a plurality of strips of film to be treated in suspended positions above said tank, means for lowering said carrier and said films at selected speeds, whereby successive portions of the films will be immersed in the dye or bleaching solution for gradually increasing periods of time corresponding to the relative positions of the said portions of films in the tank at the completion of the lowering operation, and connections between the carrier and a source of supply for imparting fluid pressure to and for operating the carrier and film, and means for counterbalancing the operating of the carrier to permit the ready retraction thereof to position for removing the film therefrom.

RAYMOND C. MERCER.